United States Patent [19]

Arakawa

[11] Patent Number: 4,719,472

[45] Date of Patent: Jan. 12, 1988

[54] INK JET RECORDING HEAD

[75] Inventor: Junichi Arakawa, Yokohama, Japan

[73] Assignee: Canon Kabushiki Kaisha, Tokyo, Japan

[21] Appl. No.: 843,818

[22] Filed: Mar. 27, 1986

Related U.S. Application Data

[63] Continuation of Ser. No. 501,565, Jun. 6, 1983, abandoned.

[30] Foreign Application Priority Data

Jun. 18, 1982 [JP] Japan ............ 57-103970

[51] Int. Cl.[4] ............ G01D 5/18

[52] U.S. Cl. ............ 346/140 R; 346/75

[58] Field of Search ............ 346/75, 140 R

[56] References Cited

U.S. PATENT DOCUMENTS 3,747,120 7/1973 Stemme ............ 346/75
3,761,953 9/1973 Helgeson et al. .
3,999,190 12/1976 Brown et al. ............ 346/140 R
4,007,684 2/1977 Takano et al. ............ 346/140 R
4,250,512 2/1981 Kattner et al. ............ 346/140 R
4,337,467 6/1982 Yano .
4,346,388 8/1982 Wiley ............ 346/75
4,392,907 7/1983 Shirato et al. ............ 156/252 X
4,394,670 7/1983 Sugitani et al. ............ 346/140 R
4,449,033 5/1984 McClure et al. .
4,454,518 6/1984 Bangs ............ 346/140 R

FOREIGN PATENT DOCUMENTS 455249 12/1974 U.S.S.R. .

OTHER PUBLICATIONS

E. E. Gardner, "Semiconductor Temperature Sensor", *IBM Technical Disclosure Bulletin,* vol. 8, No. 3, Aug. 1965, pp. 458–459.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An ink jet recording head, in which ink supplied from an ink supply source is discharged from an orifice, comprises a unit responsive to an electrical signal to discharge the ink from the orifice, ad a unit for adjusting the temperature of the ink discharged from the orifice.

7 Claims, 5 Drawing Figures

INK JET RECORDING HEAD

This application is a continuation of application Ser. No. 501,565 filed June 6, 1983, now abandoned.

BACKGROUND OF THE INVENTION

1. Field of the Invention

This invention relates to an ink jet recording head and ink jet printer in which ink supplied from an ink supply source is discharged in response to a recording signal to thereby effect recording.

2. Description of the Prior Art

Ink jet printers are classified into the type which uses an electro-mechanical converting element such as a piezo element to discharge ink and the type which uses an electro-thermal converting element to discharge ink. The ink used in such ink jet printers has its quality varied with changes in the atmospheric temperature, for example. That is, as shown in FIG. 1 of the accompanying drawings, when the temperature is low, the viscosity and surface tension of the liquid are substantially increased and therefore, the diameter of liquid drops formed becomes small and in some cases, satellites and splashes are caused and, even further, ink injection may become impossible altogether.

SUMMARY OF THE INVENTION

It is an object of the present invention to provide an ink jet recording head which ensure that good recording is accomplished.

It is another object of the present invention to eliminate the adverse effect of changes in the atmospheric temperature on the quality of recording.

It is still another object of the present invention to provide a thermal type ink jet recording head which ensures a good quality of recording.

It is yet still another object of the present invention to provide at a low cost a thermal type ink jet recording head which ensures a good quality of recording.

It is a further object of the present invention to facilitate the manufacture.

It is still a further object of the present invention to provide an ink jet recording head which is capable of more reliably adjusting the temperature of the ink discharged from an orifice.

It is another object of the present invention to provide an ink jet printer which ensures good recording to be accomplished.

It is still another object of the present invention to provide a thermal type ink jet printer which ensures a good quality of recording.

The invention will become fully apparent from the following detailed description thereof taken in conjunction with the accompanying drawings.

DESCRIPTION OF THE PREFERRED EMBODIMENT

Figure 1:
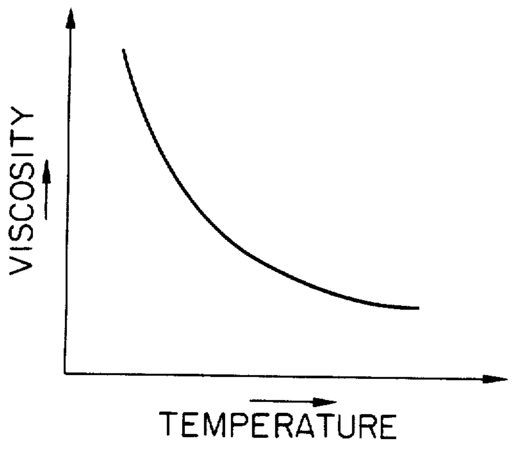
FIG. 1 is a graph showing the characteristic of the viscosity of the ink used in a recording head in relation to temperature.
Figure 2:
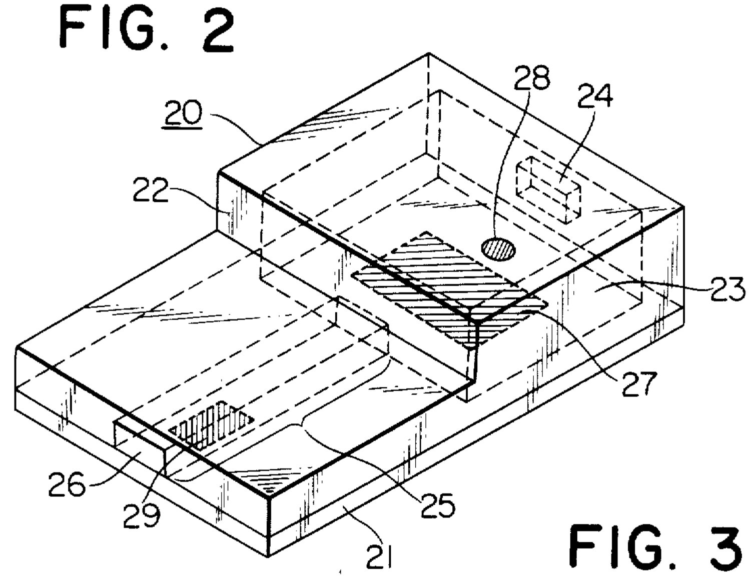
FIG. 2 is a perspective view showing the appearance of a recording head according to the present invention.

Referring to FIG. 2 which shows the construction of an ink jet recording head according to an embodiment of the present invention, the ink jet recording head 20 is formed by adhesively securing a base plate 21 and a lid member 22 to each other. A rectangular hole of relatively large volume is formed in the joined surface of the lid member 22 and the base plate 21, and an ink reservoir 23 is formed. Ink is supplied from an ink container (not shown) which is an ink supply source to the ink reservoir 23 through a supply passage 24 formed in the lid member 22. A groove of much smaller volume than the ink reservoir 23 and having one end connected to the ink reservoir 23 and the other end open to the atmosphere is also formed in the joined surface of the lid member 22 and the base plate 21, and after assembly, it forms an ink discharge flow path 25 and an ink discharge orifice 26. The ink thus supplied from the ink container passes through the ink reservoir 23 and the ink discharge flow path 25 which are ink flow paths and is discharged as drops from the orifice 26.

A heating resistor 27 for heating the ink in the reservoir 23 and a temperature sensor 28 which is a temperature detecting element are provided at a position on the base plate 21 which corresponds to the reservoir 23. Further, a heating resistor 29 for ink discharge, which is adapted to heat in response to a recording signal, is provided at a position on the base plate 21 which corresponds to the ink discharge flow path 25. The heating resistors 27 and 29 are formed at one time by etching or sputtering a resistance layer formed on the insulative base plate 21. If the temperature sensor 28 is a thermistor, it may also be easily formed by etching, as with the heating resistors.

Figure 3:
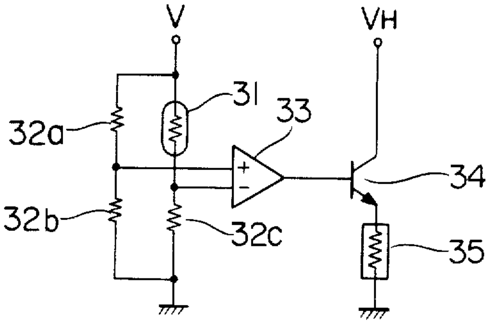
FIG. 3 is a circuit diagram showing the construction of a temperature detecting circuit used in the recording head of FIG. 2.
Figure 4:
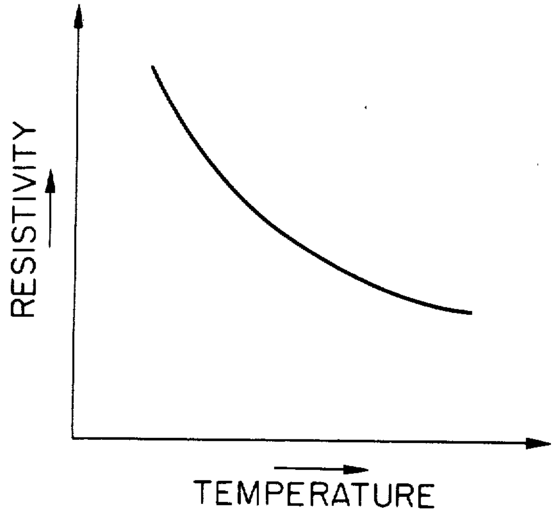
FIG. 4 is a graph showing the characteristic of a temperature sensor.

FIG. 3 shows an example of a control circuit for controlling the current flowing to a heater in case a thermistor is used as the temperature sensor in FIG. 2. In FIG. 3, reference numeral 31 designates a thermistor (which corresponds to the temperature sensor 28 of FIG. 2). One end of this thermistor is connected to a power source terminal and the other end thereof is connected to a resistor 32*c*. The junction between the thermistor 31 and the resistor 32*c* is connected to the minus input of a comparator 33. A divided reference voltage formed by resistors 32*a* and 32*b* is applied to the plus input of the comparator 33. The output of the comparator 33 is applied to the base of a transistor 34. A heater 35 corresponding to the heating resistor 27 of FIG. 2 is connected between the emitter and earth of the transistor 34. The thermistor, as shown in FIG. 4, has a characteristic that its resistance value becomes smaller as the temperature becomes higher.

In such a construction, when the temperature is so low that the ink must be heated, the resistance of the thermistor 31 increases at a temperature lower than that temperature and the potential on the minus input side of the comparator 33 becomes lower than the potential on the plus input side of the comparator 33, whereby the output of the comparator 33 always assumes a high level at a temperature lower than that temperature and thus, the transistor 34 is turned on, whereby a current flows to the heater 35 to heat the ink in the ink reservoir 23. The ink thus heated is further supplied from the ink reservoir 23 to the ink discharge flow path 25, where the ink is heated by the heating resistor 29 and is injected as drops from the orifice 26.

If the temperature at which the transistor 34 is turned off is set to a level higher than room temperature, the viscosity of the ink can be kept constant even for a rise of the room temperature. The volume of the ink reservoir 23 should preferably be set to such a degree that the temperature of the ink in the reservoir can restore a predetermined value in a short time by the heating of the heating resistor 27.

The volume of the ink discharge flow path 25 is very small and after all, the ink always at a predetermined temperature stored in the ink reservoir 23 is discharged from the orifice 26.

Figure 5:
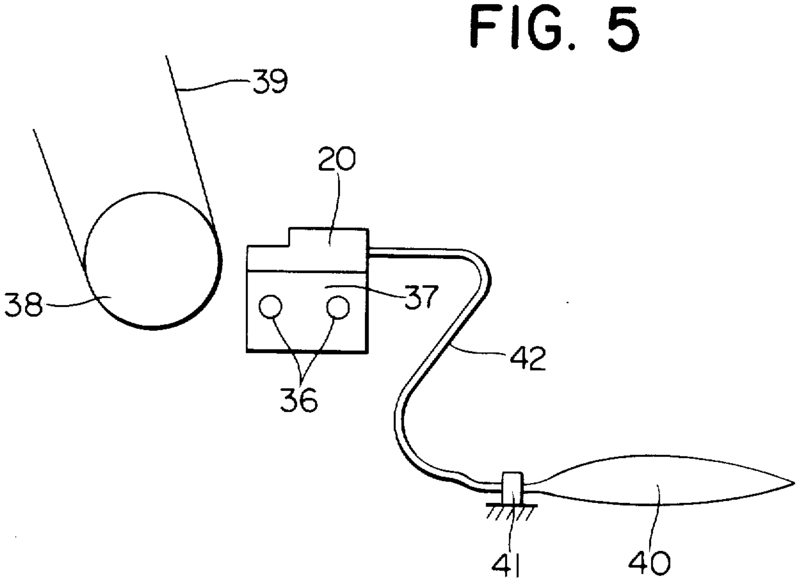
FIG. 5 illustrates a thermal type ink jet printer using the recording head of FIG. 2.

FIG. 5 shows an ink jet printer using the recording head of FIG. 2. The recording head 20 is supported on a carriage 37 reciprocable perpendicularly to the plane of the drawing sheet while being guided by two guide rails 36. Recording paper 39 is wound round a plate 38 provided parallel to the guide rails 36, and the ink discharged from the recording head 20 is transferred onto the recording paper 39. Designated by 40 is an ink container consisting of a flexible flat bag. The ink outlet portion of the ink container 40 is fixed to a fixed portion 41 and connected to the recording head 20 by a flexible tube 42. The supply of ink from the ink container 40 to the recording head 20 is accomplished chiefly by a pump pressure created in the tube 42 by reciprocal movement of the carriage 37.

In the above-described embodiment, only one ink discharge flow path or nozzle is provided, but again in the case of a multi-nozzle construction wherein a plurality of nozzles are provided, a heating resistor may be provided in the ink reservoir which supplies ink to each nozzle, and the ink heated thereby can be supplied to the respective nozzles.

The temperature detecting means is not limited to the thermistor, but means such as bimetal may also be used to obtain a similar effect, and in some cases, it may be disposed not always in the ink reservoir but in the vicinity thereof. Also, the heating resistor 27 can be formed on the base plate 21 like the heating resistor 29 for ink discharge, and this leads to an advantage that the cost is lower than in a case where a discrete heater is provided outside. In the above-described embodiment, adjustment of the ink temperature is accomplished by the heating resistor, but alternatively, the ink temperature may be adjusted by the use of a cooler.

Further, the ink jet printer is not limited to a serial type having a carriage but may also be a so-called full multi-type one having nozzles over the full width of the recording paper. And "ink" as used herein, refers to any liquid directed to recording. Further, the means for discharging the ink is not limited to an electro-thermal converting element but may also be an electro-mechanical converting element such as a piezo element.

According to the present invention described above, the ink temperature is adjusted to a predetermined temperature suitable for ink injection, and this leads to an excellent result that reliability in drop formation of the recording head is remarkably improved to ensure stable ink injection to be accomplished.

What I claim is:

1. An ink jet recording head in which ink supplied from an ink supply source is dischargeable from an orifice, the head comprising:

a substrate;

a lid member attached to said substrate to form therewith a reservoir for accepting ink from the ink supply source and a liquid flow path leading from an inlet at said reservoir to the orifice;

first heating means disposed on said substrate to provide a heating surface in said liquid flow path for applying heat to ink therein to cause discharge of ink from the orifice;

second heating means disposed on said substrate to provide a heating surface in said reservoir for applying heat to ink therein to adjust the viscosity of ink entering said inlet of said liquid flow path, wherein said first and second heating means have substantially the same configuration; and a temperature sensor for providing a signal corresponding to the temperature of the ink in said reservoir to control the heat applied to the ink by said second heating means.

2. An ink jet recording head according to claim 1, wherein said second heating means is disposed proximate to said inlet of said liquid flow path and said temperature sensor is disposed on said substrate.

3. An ink jet recording head according to claim 2, wherein said first and second heating means include resistors formed on said substrate and said temperature sensor includes a thermistor.

4. An ink jet recording head according to claim 3, wherein said thermistor includes means for connection to comparator means for comparing the voltage across said thermistor with a reference voltage to actuate said second heating means when the resistance across said thermistor indicates that the ink in the reservoir is below a predetermined temperature.

5. An ink jet recording head according to claim 1, wherein said temperature sensor includes a thin-film thermistor.

6. An ink jet recording head for discharging ink from an orifice in response to a recording signal, the recording head comprising:

a substrate;

an ink flow path disposed on said substrate and communicating with an orifice;

a reservoir, disposed on said substrate and having a capacity larger than that of said ink flow path, for storing ink supplied from an ink supply source;

first heating means, disposed on said substrate at said ink flow path, for heating ink in said ink flow path in response to the recording signal to generate heat energy for discharging ink from the orifice;

second heating means, disposed on said substrate at said reservoir, for heating ink to be supplied to said ink flow path, wherein said first and second heating means have substantially the same configuration; and temperature sensing means for generating a signal corresponding to the temperature of the ink in said reservoir to control the heat applied to the ink by said second heating means.

7. An ink jet printer including an ink jet recording head, said head comprising:

a substrate;

an ink flow path disposed on said substrate and communicating with an orifice;

a reservoir, disposed on said substrate and having a capacity larger than that of said ink flow path, for storing ink supplied from an ink supply source;

first heating means, disposed on said substrate at said ink flow path, for heating ink in said ink flow path in response to a recording signal to generate heat energy for discharging ink from the orifice;

second heating means, disposed on said substrate at said reservoir, for heating ink to be supplied to said ink flow path, wherein said first and second heating means have substantially the same configuration;

temperature sensing means for generating a signal corresponding to the temperature of the ink in said reservoir;

control means for controlling the heat generated by said second heating means in accordance with the signal generated by said temperature sensing means; and driving means for driving said first heating means in response to the recording signal.

* * * * *

UNITED STATES PATENT AND TRADEMARK OFFICE
CERTIFICATE OF CORRECTION

PATENT NO. : 4,719,472
DATED : January 12, 1988
INVENTOR(S) : JUNICHI ARAKAWA

It is certified that error appears in the above-identified patent and that said Letters Patent is hereby corrected as shown below:

AT [57] IN THE ABSTRACT

Line 4, "ad" should read --and--.

COLUMN 1

Line 30,"ensure" should read --ensures--.

COLUMN 3

Line 53, ""ink"" should read --"ink",--.

Signed and Sealed this

Twenty-first Day of June, 1988

Attest:

DONALD J. QUIGG

Attesting Officer

*Commissioner of Patents and Trademarks*